US 6,748,243 B1

(12) United States Patent
Kubo et al.

(10) Patent No.: US 6,748,243 B1
(45) Date of Patent: Jun. 8, 2004

(54) FOLDING PORTABLE TELEPHONE APPARATUS

(75) Inventors: Tetsuya Kubo, Kanagawa (JP); Ryouichi Kaiwa, Kanagawa (JP); Naokazu Nagasawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 213 days.

(21) Appl. No.: 09/704,645

(22) Filed: Nov. 2, 2000

(30) Foreign Application Priority Data

Nov. 5, 1999 (JP) .......................... P11-316120

(51) Int. Cl.⁷ ................................ H04B 1/38
(52) U.S. Cl. ................. 455/569.1; 455/566; 455/575.3
(58) Field of Search ................ 455/90, 566, 509, 455/569.1, 460, 575.1, 575.3, 575.7, 556.1, 566.2

(56) References Cited

U.S. PATENT DOCUMENTS

| 5,907,306 A | * | 5/1999 | Karabinis | 343/702 |
| 5,953,413 A | * | 9/1999 | Peyer | 379/433 |
| 6,122,530 A | * | 9/2000 | Overy et al. | 455/566 |
| 6,125,286 A | * | 9/2000 | Jahagirdar et al. | 455/566 |
| 6,259,932 B1 | | 7/2001 | Constien | |
| 6,389,267 B1 | * | 5/2002 | Imai | 455/90 |
| 6,397,087 B1 | * | 5/2002 | Kim et al. | 455/569.1 |
| 6,445,932 B1 | * | 9/2002 | Soini et al. | 455/556.1 |
| 6,459,911 B1 | * | 10/2002 | Hijii | 455/563 |
| 6,571,086 B1 | * | 5/2003 | Uusimaki | 379/368 |

FOREIGN PATENT DOCUMENTS

| EP | 0776140 A1 | * | 5/1997 | ............ H04Q/7/32 |
| EP | 0 897 236 A2 | | 2/1999 | |
| GB | 2322508 A | * | 8/1998 | ............ H04M/1/02 |
| GB | 2 322 508 A | * | 8/1998 | ............ H04M/1/02 |
| GB | 2 326 051 A | | 12/1998 | |
| GB | 2327559 A | * | 1/1999 | ............ G09G/5/22 |
| GB | 2 327 559 A | * | 1/1999 | ............ H04M/1/60 |
| GB | 3 327 559 A | * | 1/1999 | ............ H04M/1/60 |
| GB | 2344028 A | | 5/2000 | |
| GB | 2355149 A | | 4/2001 | |
| JP | 5-91584 | | 4/1993 | |
| JP | 5-103063 | | 4/1993 | |
| JP | 6-30095 | | 2/1994 | |
| JP | 10341272 A | | 12/1998 | |
| WO | WO 96/38970 | | 12/1996 | |
| WO | WO 97/09813 | * | 3/1997 | ............ H04M/1/72 |

* cited by examiner

Primary Examiner—William Trost
Assistant Examiner—Brandon J Miller
(74) Attorney, Agent, or Firm—Pearne & Gordon LLP

(57) ABSTRACT

A first display (4) comprising a liquid crystal display is provided on the outer surface of a first case body (1). In the near proximity of the first display (4), a call start button (5), a call release button (6), and a so-called navigation key (7) having an arrow key for scrolling in four directions and a center key for selecting and determining target information. A second display (8) is provided on the inner surface of the first case body (1). An antenna 9 is provided retractable slantwise on the side of the second case body (2). A magnet (18) is embedded in the first case body (1), and a lead switch 19 is embedded in the second case body (2). When the main body is folded to bring the magnet (18) in close proximity to the lead switch (19), the lead switch is turned ON. When the main body is unfolded to place the magnet (18) apart from the lead switch (19), the lead switch is turned OFF. This allows detection of folding/unfolding of the main body. At the lower portion of the side where the antenna (9) is located, an earphone microphone jack 37 is provided.

16 Claims, 14 Drawing Sheets

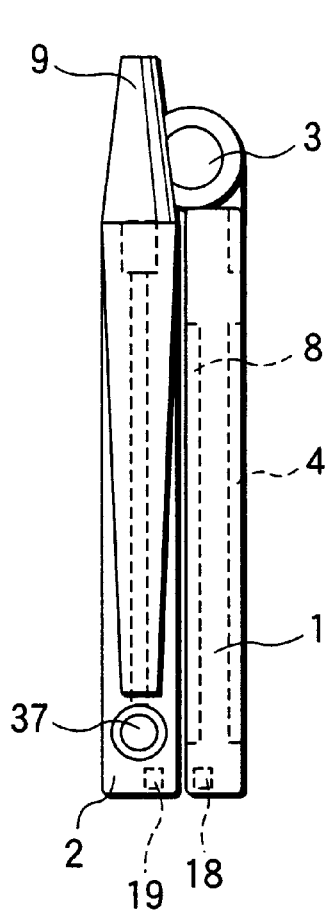
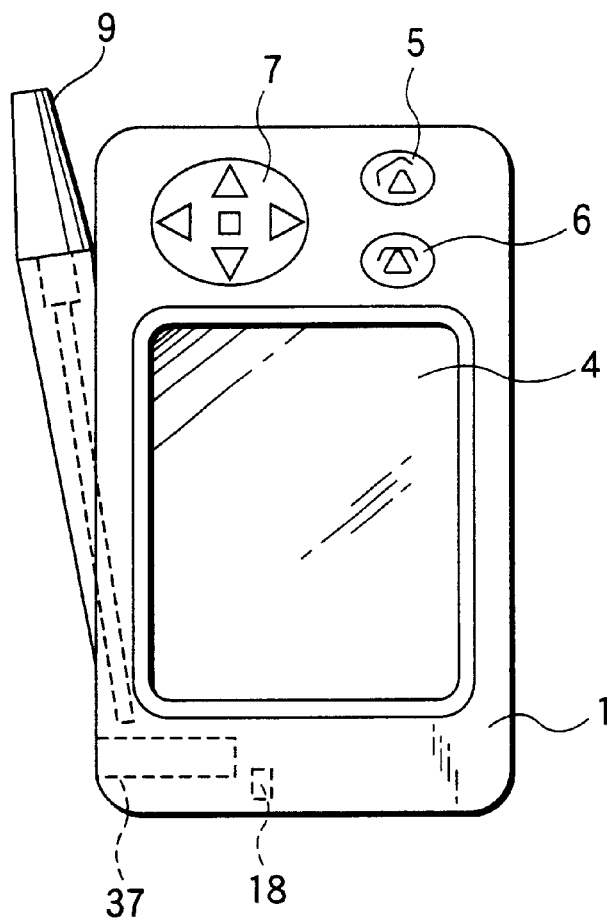

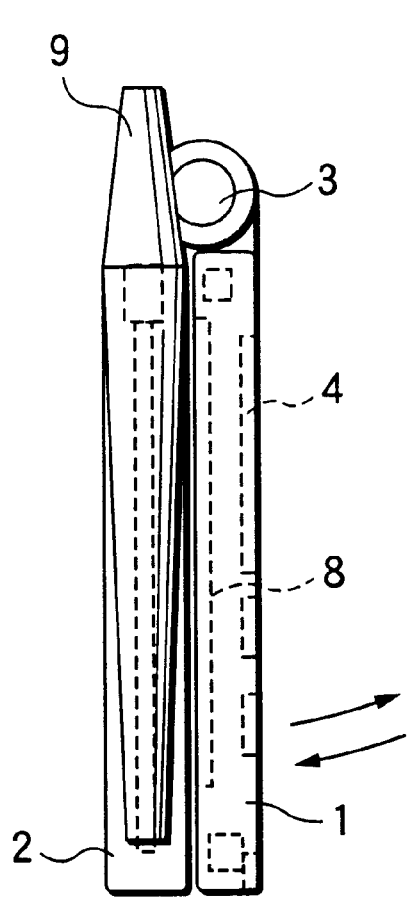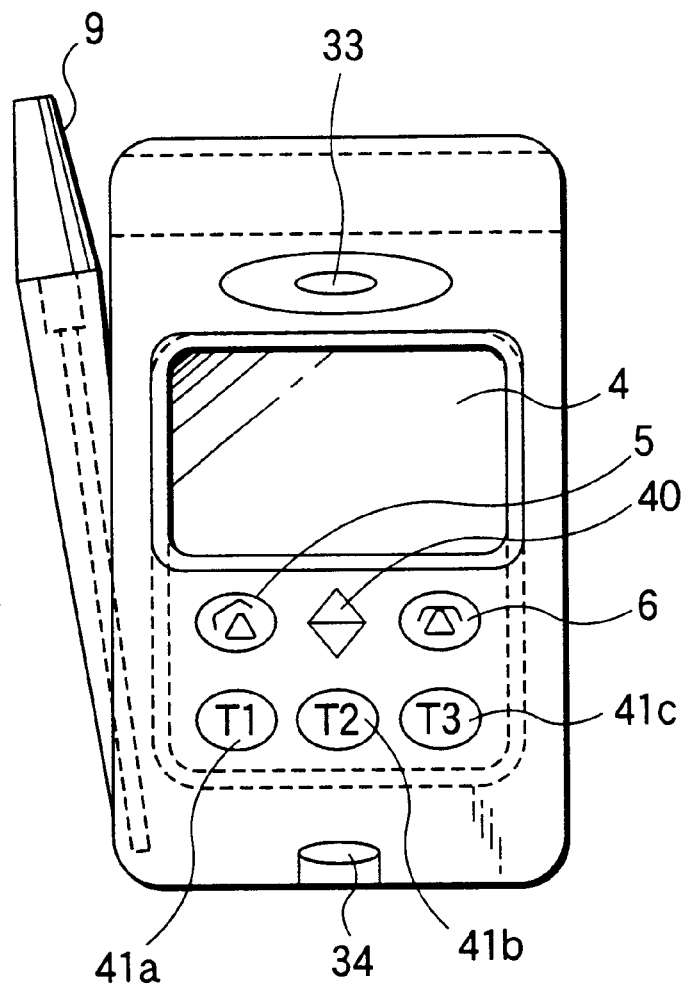

FOLDING PORTABLE TELEPHONE APPARATUS

BACKGROUND OF THE INVENTION

The present invention relates to folding portable telephone apparatus whereby the user can originate, be engaged in, and answer a call with the body folded as well as unfolded.

The conventional portable telephone apparatus as shown in FIGS. 14A and 14B incorporates an operation area and a display area in compact size by folding the operation area comprising a ten-digit keypad 10 and the display area comprising a liquid crystal display facing each other when the user is not engaged in a call, like a shell protecting its inner.

Such conventional portable telephone apparatus is wherein the operation area and the display area are inside the main body and cannot be seen from outside when the main body is folded. Therefore, at a time of incoming call, the user cannot check caller information such as the telephone number of the caller or caller's name, and unless the main body is unfolded, the user can not know who the caller is. Recently, in particular, a feature is possible whereby the user can be engaged in a call as soon as the user unfolds the main body at a time of the incoming call. Such setting may results in the user answering a call against his/her will.

It is convenient to be able to answer or originate a call with the main body folded in compact size as shown in FIGS. 14A and 14B, as well as with the main body unfolded as shown in FIG. 14C.

SUMMARY OF THE INVENTION

The present invention aims at providing folding portable telephone apparatus that eliminates the conventional disadvantage and whereby the user can answer, originate, and be engaged in a call with the main body folded as well as with the main body unfolded.

The first aspect of the invention is folding portable telephone apparatus having a folding main body, wherein the apparatus is equipped with at least first display, a call start button, and a call release button on the outer surface of the main body and second display on the inner surface of the main body, that an earphone microphone is provided on the main body in a detachable way, that the telephone number of the caller of a terminating call or the name associated with the telephone number is displayed on the first display or a destination telephone number in call origination or the name corresponding to the destination telephone number is displayed, and that the user originates a call by operating the call start button, talk with the distant party, and releases the call by operating the call release button. Via this configuration, the user can check the telephone number of the caller or the name of the caller even when the main body is folded, then the user can answer a call and talk with the distant party via an earphone microphone.

The second aspect of the invention is folding portable telephone apparatus having a folding main body, wherein the apparatus is equipped with at least first display on the outer surface of the main body and second display on the inner surface of the main body, that an earphone microphone with switch is provided on the main body in a detachable way, that the telephone number of the caller of a terminating call or the name associated with the telephone number is displayed on the first display or a destination telephone number in call origination or the name corresponding to the destination telephone number is displayed, and that the user originates a call by operating the switch of the earphone microphone with switch, talk with the distant party via the earphone microphone with switch, and releases the call by operating the switch of the earphone microphone with switch. Via this configuration, the user can check the telephone number of the caller or the name of the caller even when the main body is folded, then the user can answer a call, talk with the distant party, and release the call by using an earphone microphone with switch.

The third aspect of the invention is folding portable telephone apparatus having a folding main body, wherein the apparatus is equipped with at least first display, a call start button, a call release button, a transmitter, and a receiver on the outer surface of the main body and second display on the inner surface of the main body, that at least the telephone number of the caller of a terminating call or the name associated with the telephone number is displayed on the first display or a destination telephone number in call origination or the name corresponding to the destination telephone number is displayed, and that the user originates a call by operating the call start button, talk with the distant party via the transmitter and the receiver on the outer surface of the main body, and releases the call by operating the call release button. Via this configuration, the user can check the telephone number of the caller or the name of the caller even when the main body is folded, then the user can answer a call and talk with the distant party via the transmitter and the receiver on the outer surface of the main body.

The fourth aspect of the invention is folding portable telephone apparatus according to any of the first through third aspect of the invention, wherein the apparatus is equipped with an antenna retractable slantwise on the side of the main body. Via this configuration, it is possible to make the main body easier to grasp without the antenna protruding in the direction of thickness of the main body and reducing the protrusion from an antenna receiver at the foot of the antenna.

BRIEF DESCRIPTION OF THE DRAWINGS

FIG. 1A is a side view of folding portable telephone apparatus according to the first embodiment of the invention with the main body folded.

FIG. 1B is a front view of the folding portable telephone apparatus according to the first embodiment of the invention with the main body folded.

FIG. 9A is a side view of folding portable telephone apparatus according to the third embodiment of the invention with the main body folded.

FIG. 9B is a front view of the folding portable telephone apparatus according to the third embodiment of the invention with the main body folded.

DETAILED DESCRIPTION OF THE PREFERRED EMBODIMENTS

Embodiments of the invention will be explained with reference to FIGS. 1 through 13.

Figures 2A, 2B:
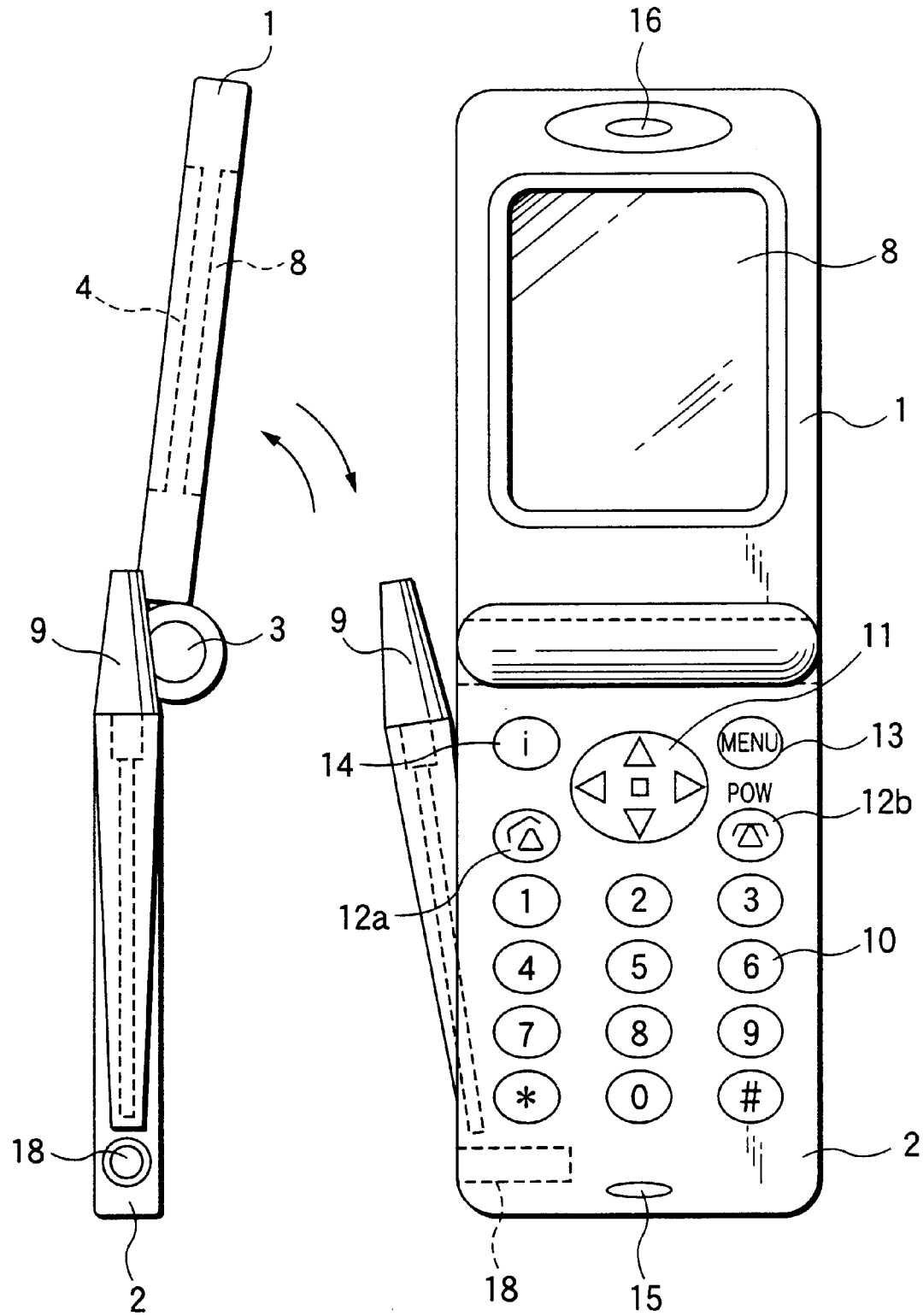
FIG. 2A is a side view of the folding portable telephone apparatus according to the first embodiment of the invention with the main body unfolded.
FIG. 2B is a front view of the folding portable telephone apparatus according to the first embodiment of the invention with the main body unfolded.

FIG. 1 shows a folding portable telephone apparatus according to an embodiment of the invention. FIG. 1A is a side view of the folding portable telephone apparatus according to an embodiment of the invention with the main body folded. FIG. 1B is a front view of the folding portable telephone apparatus according to an embodiment of the invention with the main body folded. FIG. 2A is a side view of the folding portable telephone apparatus according to an embodiment of the invention with the main body unfolded. FIG. 2B is a front view of the folding portable telephone apparatus according to an embodiment of the invention with the main body unfolded.

Configuration of the folding portable telephone apparatus will be briefly explained with reference to FIG. 1 and FIG. 2. A first case body 1 and a second case body 2 of folding portable apparatus shown in FIG. 1A are coupled via a hinge 3 so that the main body can be folded or unfolded via the hinge 3. As shown in FIG. 1B, first display 4 comprising a liquid crystal display is provided on the outer surface of the first case body 1. In the near proximity of the first display 4 are provided a call start button 5, a call release button 6, and a so-called navigation key 7 having an arrow key for scrolling in four directions and a center key for selecting and determining target information.

A second display 8 is provided on the inner surface of the first case body 1. An antenna 9 is provided retractable slantwise on the side of the second case body 2. A magnet 18 is embedded in the first case body 1, and a lead switch 19 is embedded in the second case body 2. When the main body is folded to bring the magnet 18 in close proximity to the lead switch 19, the lead switch is turned ON. When the main body is unfolded to place the magnet 18 apart from the lead switch 19, the lead switch is turned OFF. This allows detection of folding/unfolding of the main body. An earphone microphone jack 37 is provided at a lower position of the side where the antenna is located.

FIG. 2A shows folding portable telephone apparatus with the first case body 1 unfolded upward. Unfolding the first case body 1 causes controller mentioned later to display text and graphics information on the second display 8 on the inner surface of the first case body 1. With regard to the first display 4, when the body is folded, a liquid crystal backlight blinks slowly instead of displaying the text information.

On the inner surface of the second case body 2 shown in FIG. 2B are provided a key operation area composed of a ten-digit keypad 10, a so-called navigation key 11 having an arrow key for scrolling in four directions and a center key for selecting and determining target information, a call start key 12a, a call release key 12b, a menu key 13, a non-voice radio communications service start key 14 for receiving the non-voice radio communications service such as the i mode. A transmitter (microphone) 15 is provided in the lower area of the second case body 2 and a receiver (speaker) 16 is provided in the upper area of the first case body 1.

Figure 3A:
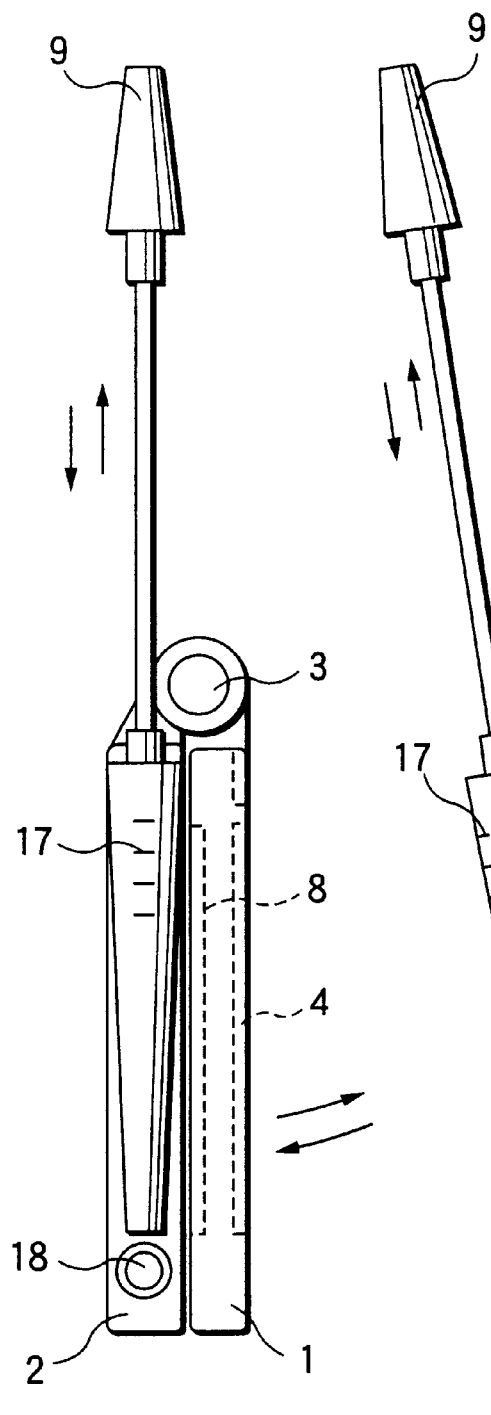
FIG. 3A is a side view of folding portable telephone apparatus according to the first embodiment of the invention with the main body folded and the antenna stretched.
Figure 3B:
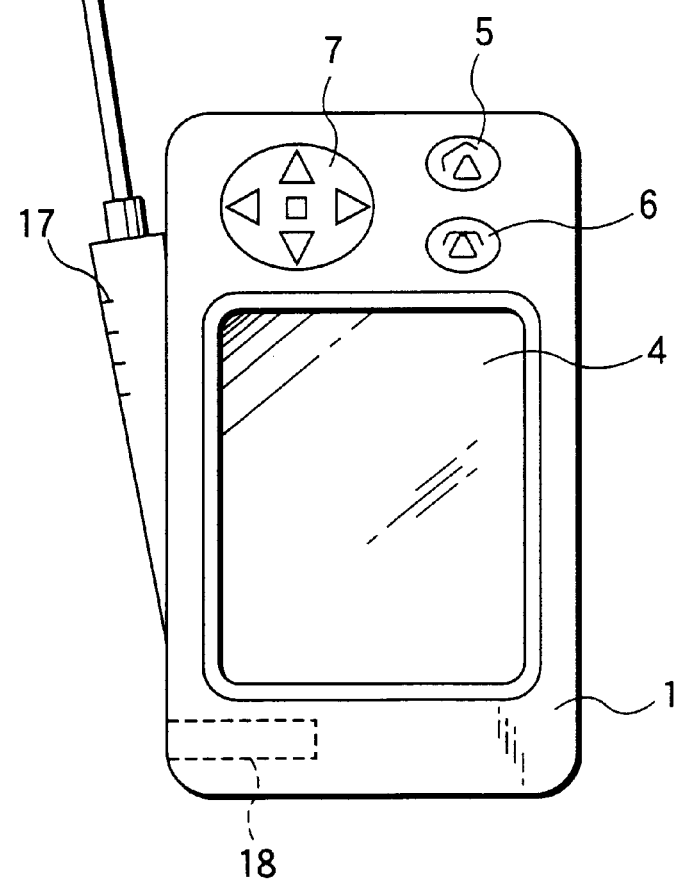
FIG. 3B is a front view of folding portable telephone apparatus according to the first embodiment of the invention with the main body folded and the antenna stretched.
Figure 4A:
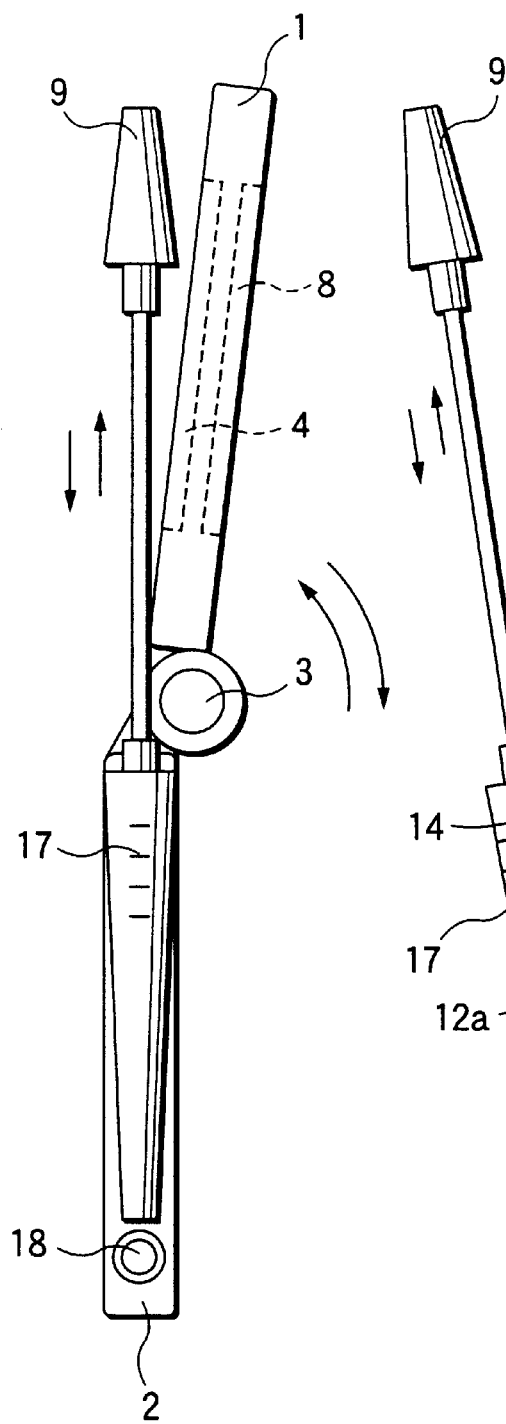
FIG. 4A is a side view of folding portable telephone apparatus according to the first embodiment of the invention with the main body unfolded and the antenna stretched.
Figure 4B:
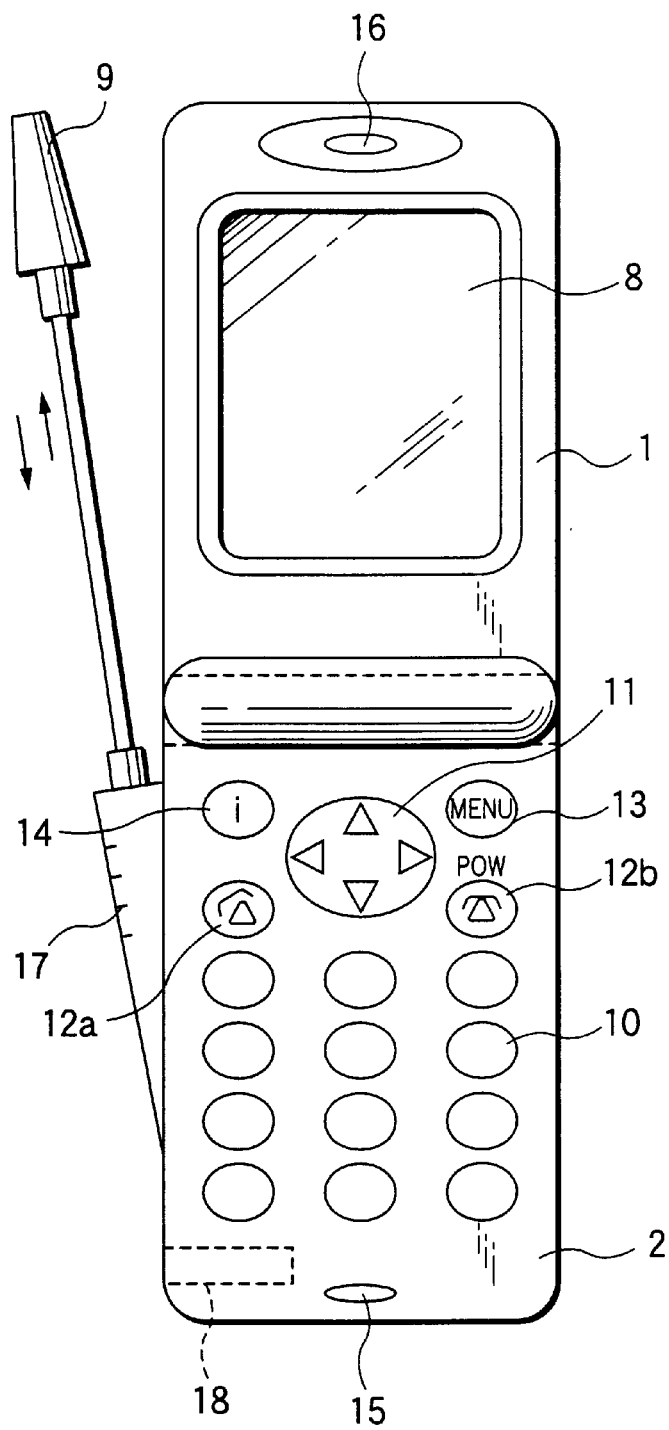
FIG. 4B is a front view of folding portable telephone apparatus according to the first embodiment of the invention with the main body unfolded and the antenna stretched.

FIG. 3A and FIG. 4A are side views of folding portable telephone apparatus according to an embodiment of the invention with the antenna stretched. FIG. 3B and FIG. 4B are front views of the folding portable telephone apparatus with the antenna stretched. The invention supports an antenna 9 retractably from bottom to top on the side of the second case body 2 so that it is possible to fold/unfold the main body irrespective of the direction of the antenna 9 and whether the antenna 9 is stretched or housed. A side groove 17 works as a non-slip when the body is grasped.

Figure 5:
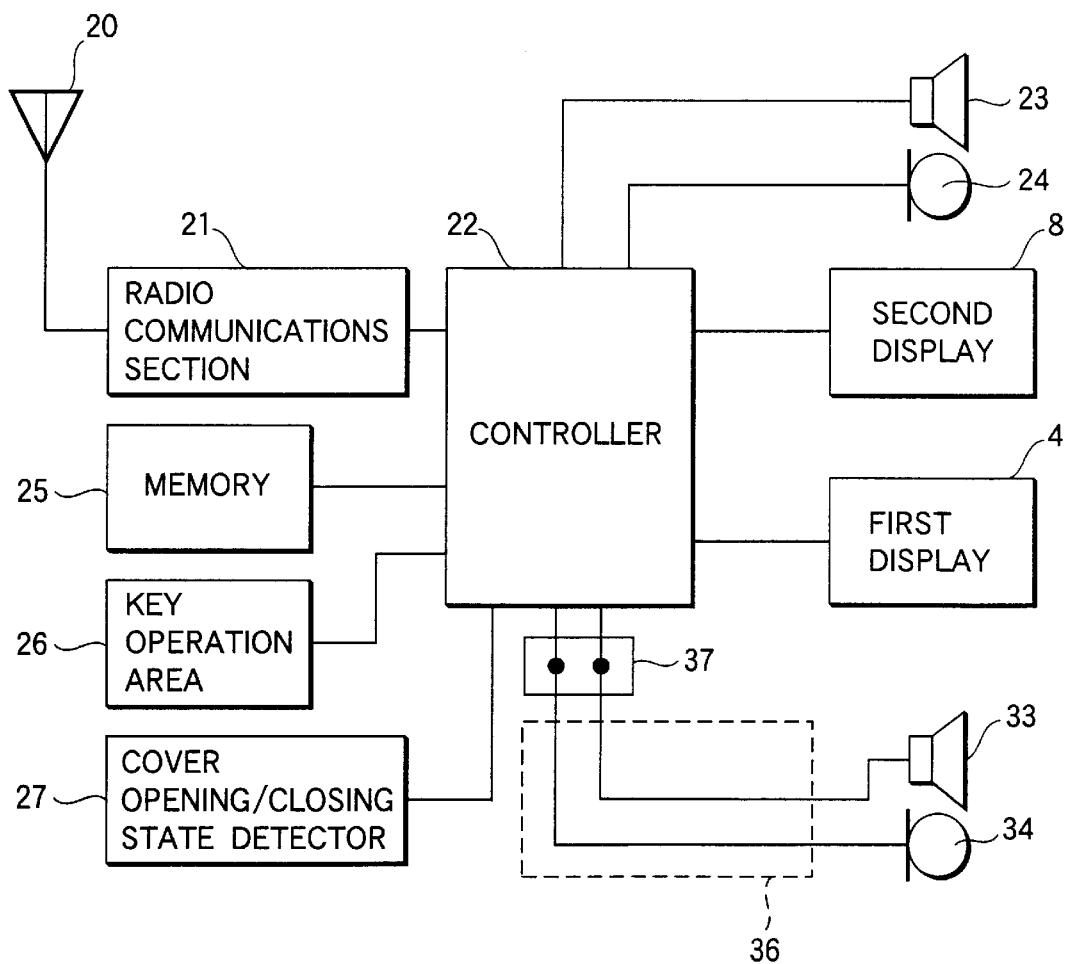
FIG. 5 is a block diagram of a configuration of folding portable telephone apparatus according to the first embodiment of the invention.

FIG. 5 is a block diagram of a configuration of a folding portable telephone apparatus according to the first embodiment of the invention. In FIG. 5, radio waves coming from an antenna 20 are received by the receiver (not shown) of a radio communications section 21 and received information is transferred to a controller 22. The controller 22 displays the received information such as telephone numbers on the first display 4 on the outer surface of the main body or on the second display 8 on the inner surface of the main body.

The controller 22 illuminates the first display 4 or second display 8 using a backlight via setting. The controller 22 also converts received information to voice information and outputs the voice information from a speaker 23 of the receiver. The transmitter (microphone) 24 transfers the user's voice to the controller 22 and transmits the information to the distant party via a transmitter (not shown) of the radio communications section 21 and the antenna 20.

The controller 22 stores information, such as single button dialing telephone numbers, in a memory 25 or reads necessary information therefrom. A key operation area 26 composed of a ten-digit keypad and a scroll key is adapted to input signals to the controller 22 via key operation, and is adapted to store telephone number information, etc. in the memory 25 via the controller 22.

A cover opening/closing state detector 27 is composed of a lead switch 19 and a magnet 18 in FIG. 1 and detects the cover opening/closing state as well as transfers detected information to the controller 22. In the memory 25 are stored control programs to perform, for example, display operation of the single button dialing, edit operation of the single button dialing, answer operation, and backlight illuminating operation.

An earphone microphone jack 37 is adapted to connect an earphone microphone 36 having an earphone 33 and a microphone 34 at the tip to the control means 22 so that the user can talk with a distant party with the main body folded.

Figure 6:
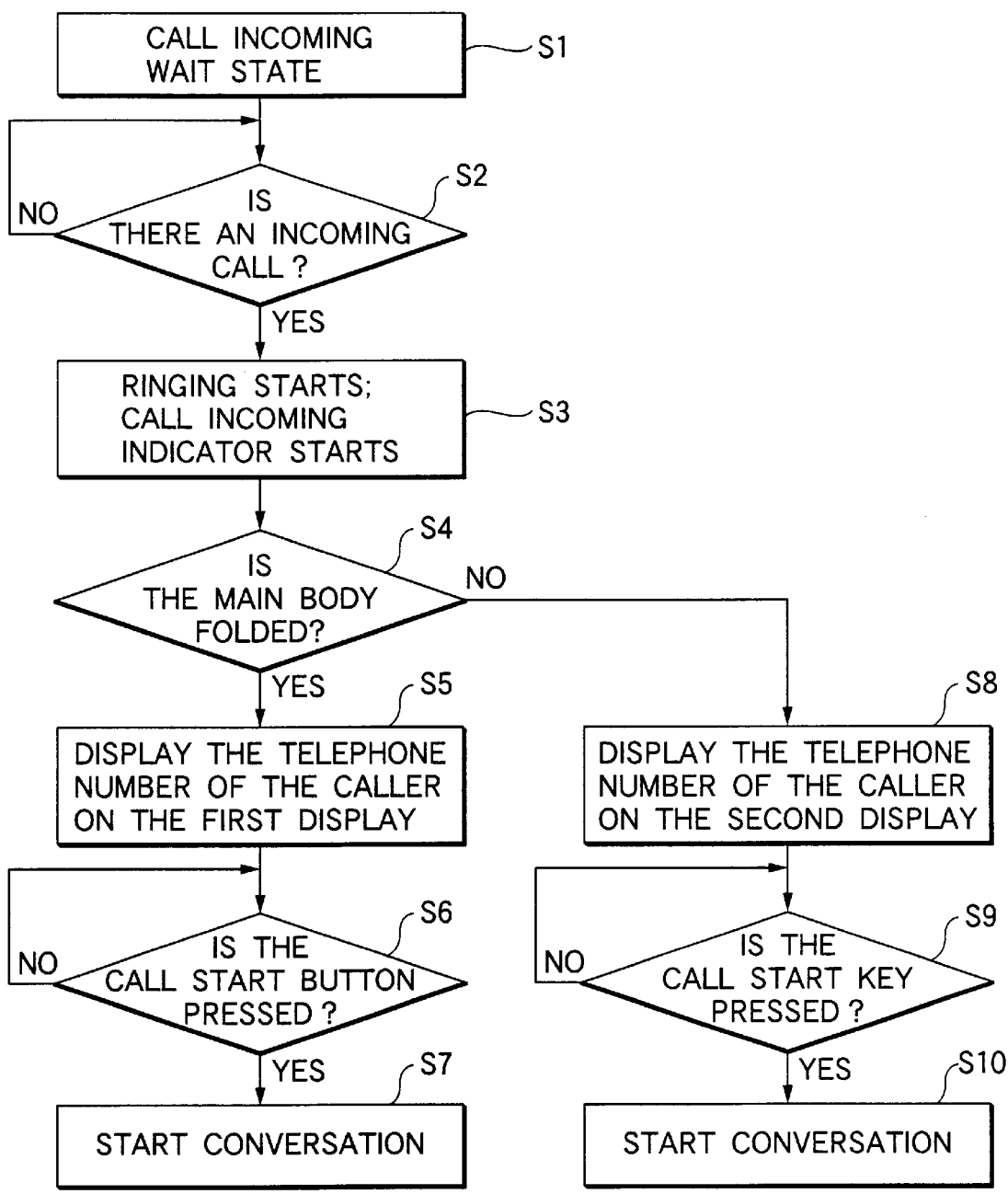
FIG. 6 is a flowchart showing the procedure for folding portable telephone apparatus according to the first embodiment of the invention, from the call incoming wait state to start of conversation.

FIG. 6 is a flowchart showing the operation in which folding portable telephone apparatus according to the first embodiment of the invention starts a call from the call incoming wait state irrespective of whether the main body is folded or unfolded. With the folding portable telephone apparatus powered on and in the call incoming wait state (step 1), when there is an incoming call (step 2), ringing starts or a call incoming indicator or a backlight on the display blinks (step 3).

The controller 22 obtains folding/unfolding state information from the cover opening/closing state detector 27 and determines whether the main body is folded or unfolded (step 4). When the main body is folded, the controller 22 displays caller information, i.e., the telephone number of the caller or caller's name on the first display 4 on the outer surface of the folded main body (step 5). When the user presses the call start button 5a (step 6), the user starts conversation using the earphone microphone 36 connected to the earphone jack 37 (step 7).

When the body is unfolded, caller information is displayed on the second display 8 on the inner surface of the main body (step 8). When a call start key 12a is pressed (step 9), the folding portable telephone apparatus starts a call by using the receiver 23 and the transmitter 24. Thus, according to the invention, the user can start conversation when the incoming call, irrespective of whether the main body is folded is folded or unfolded.

Figure 7:
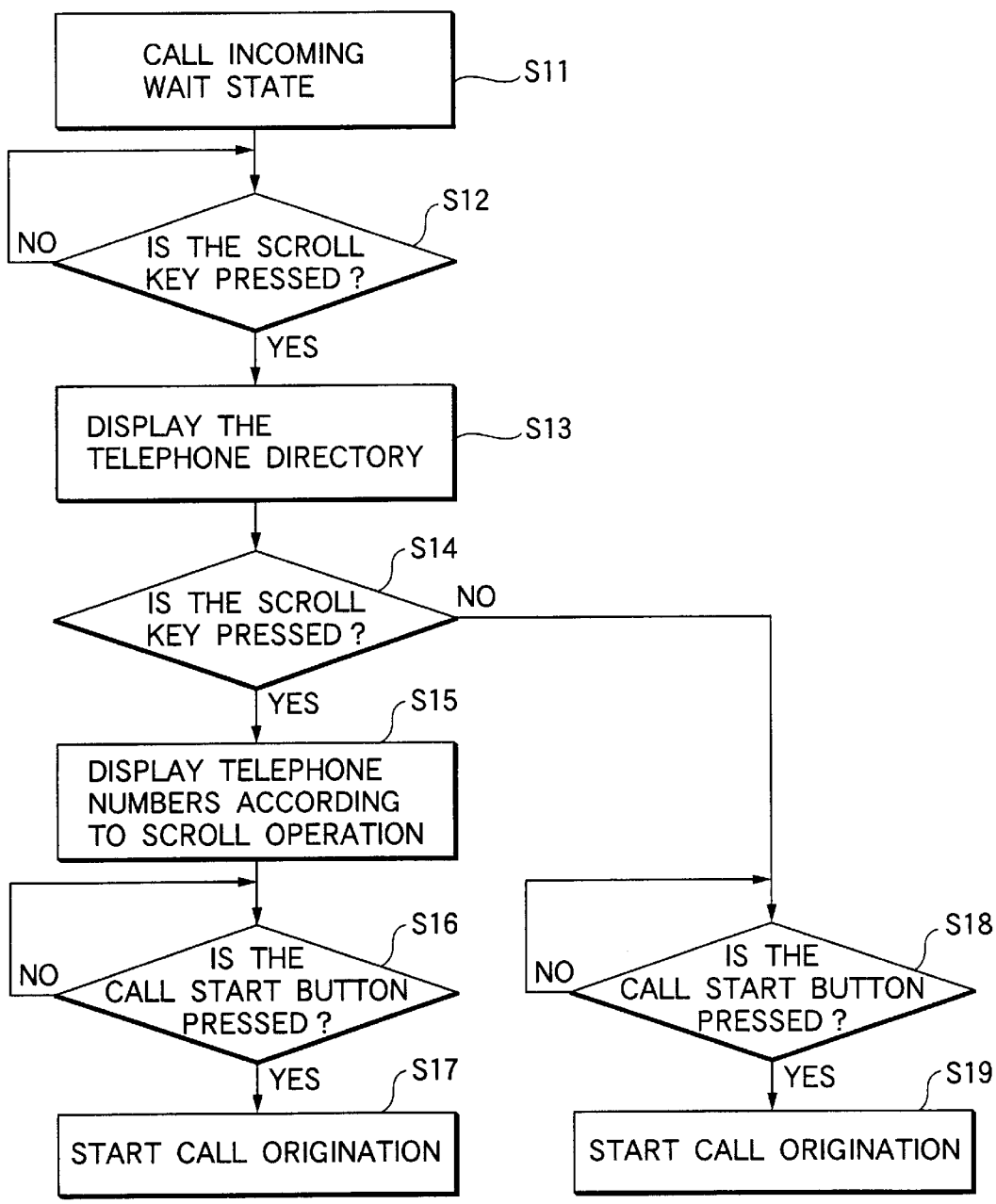
FIG. 7 is a flowchart showing the procedure for folding portable telephone apparatus according to the first embodiment of the invention, from the call incoming wait state to start of call origination.

With the main body folded, the user cannot directly enter a telephone number using the ten-digit keypad 10. As shown in the flowchart of FIG. 7, the user can register telephone numbers as a telephone directory in a memory 25, and scroll through and display the telephone numbers by using the navigation key 7, then press the call start button 5a to start call origination.

Figure 8:
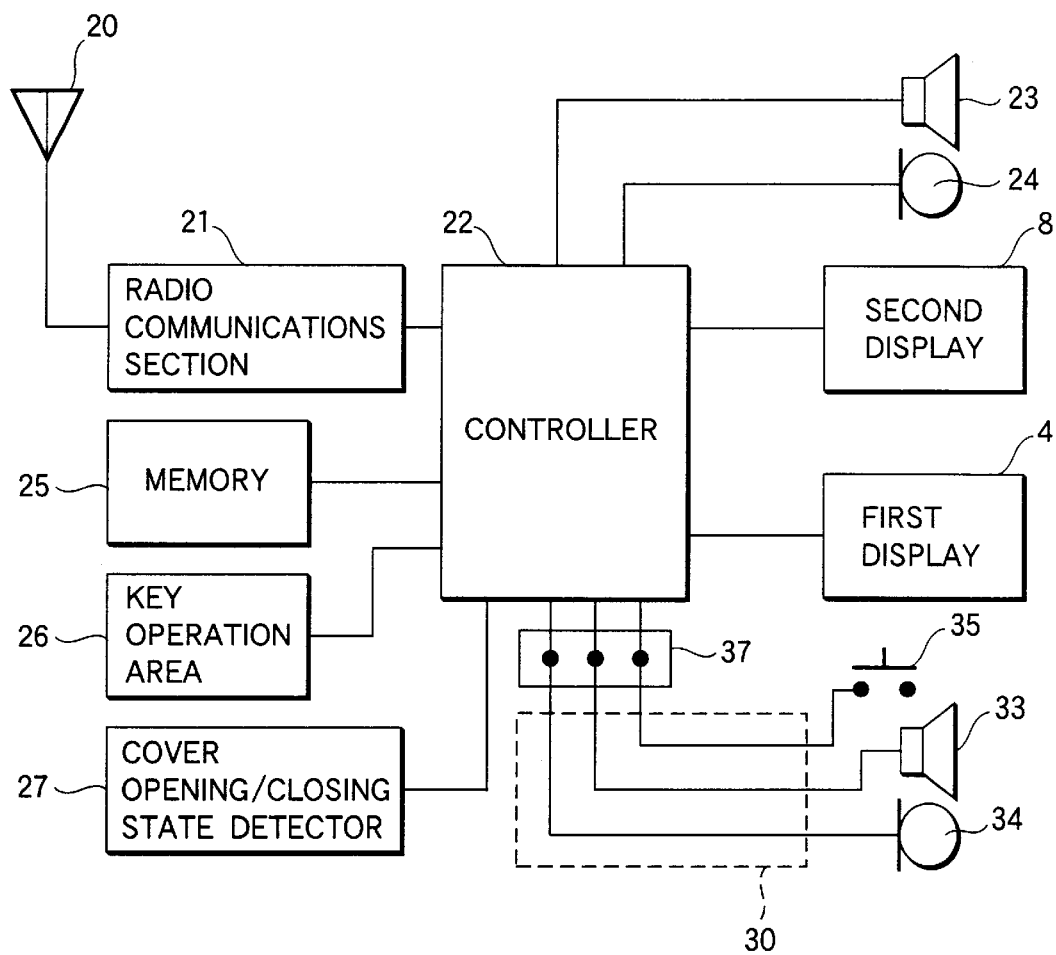
FIG. 8 is a block diagram of a configuration of folding portable telephone apparatus according to the second embodiment of the invention.

FIG. 8 is a block diagram of a configuration of folding portable telephone apparatus according to the second embodiment of the invention. The second embodiment differs from the first embodiment in that an earphone microphone 36 in FIG. 5 is replaced with an earphone microphone with switch 38 having a switch 35. The remaining sections are identical. In the second embodiment, the switch 35 of the earphone microphone with switch 38 serves as the call start button 5 and the call release button 6.

At a time of an incoming call in the aforementioned call incoming wait state, the user presses the call start button 5 to answer the call in step 6 in FIG. 6. In the second embodiment, when the main body is folded at a time of incoming call in the call incoming wait state, the user presses the switch 35 of the earphone microphone with switch 38 to answer the call. Thus the user can answer the call by pressing the switch 35 of the earphone microphone with switch 38 at hand, without pressing the call start button 5 on the main body.

Figures 10A, 10B:
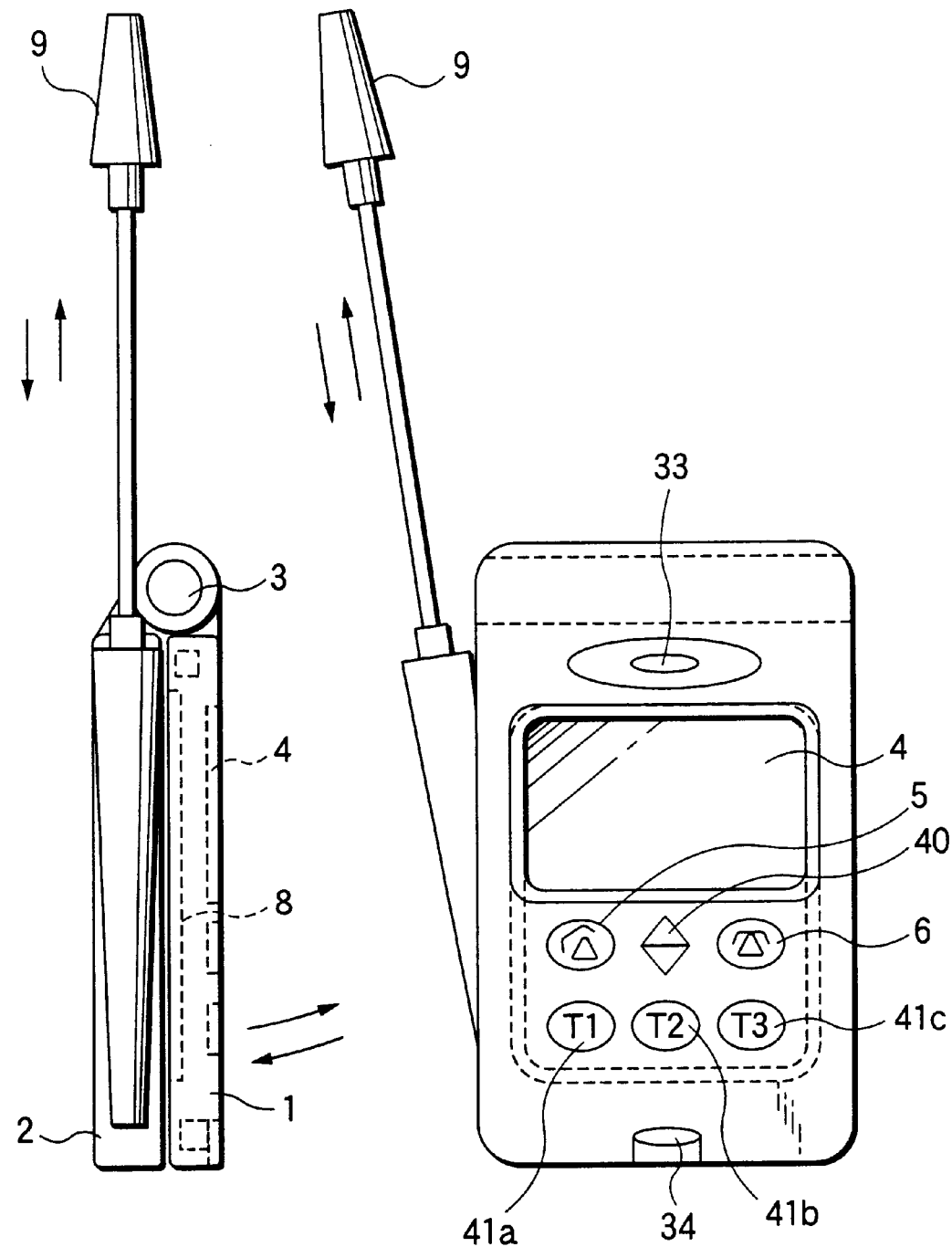
FIG. 10A is a side view of folding portable telephone apparatus according to the third embodiment of the invention with the main body folded and the antenna stretched.
FIG. 10B is a front view of folding portable telephone apparatus according to the third embodiment of the invention with the main body folded and the antenna stretched.

FIG. 9A is a side view of folding portable telephone apparatus according to the third embodiment of the invention with the main body folded. FIG. 9B is a front view of folding portable telephone apparatus according to the third embodiment of the invention with the main body folded. FIG. 10 are a side view and a front view of folding portable telephone apparatus according to the third embodiment of the invention with the antenna stretched. According to the third embodiment, a call start button 5, a call release button 6, an up/down scroll key 40, a single button dialing key (T1) 41a, a single button dialing key (T2) 41b, a single button dialing key (T3) 41c, a receiver 33, and a transmitter 33 are provided on the outer surface of the first case body 1.

Figure 11:
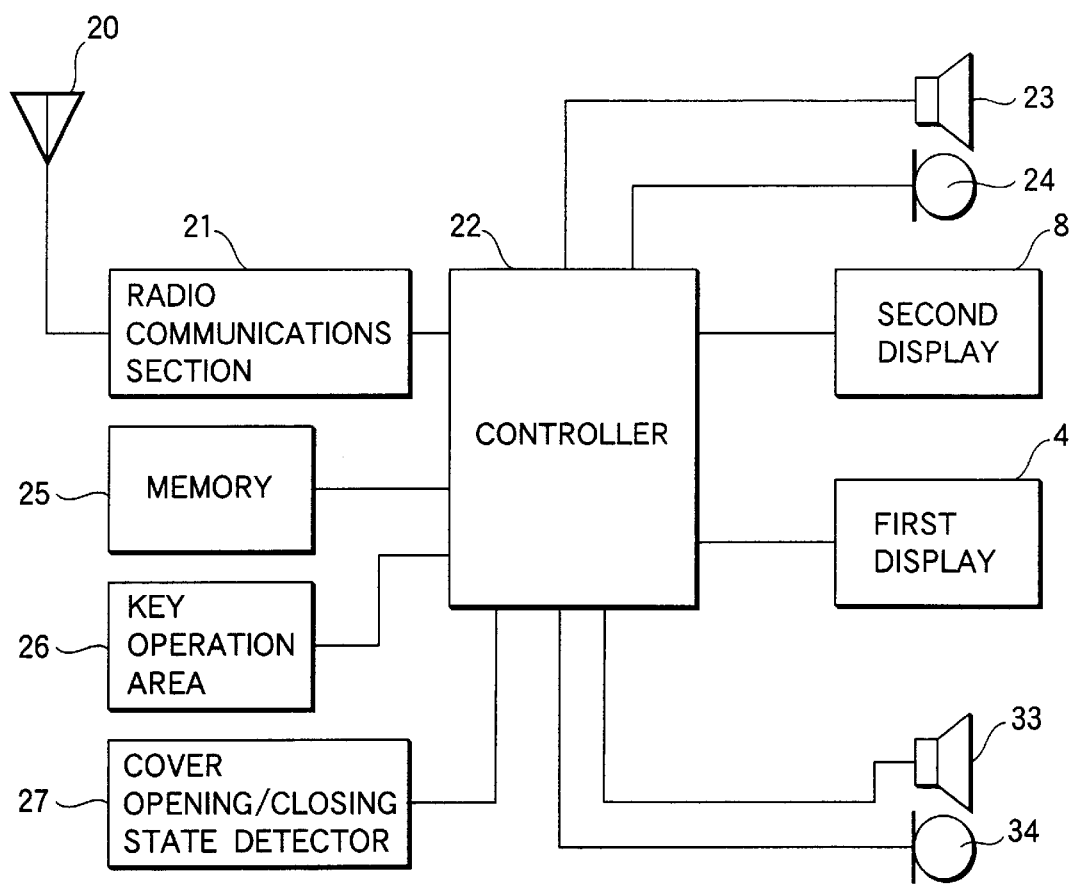
FIG. 11 is a block diagram of a configuration of folding portable telephone apparatus according to the third embodiment of the invention.

FIG. 11 is a block diagram of a configuration of folding portable telephone apparatus according to the third embodiment of the invention. In FIG. 11, the receiver 33 and the transmitter 34 are connected to the controller 22. In the memory 25 are registered in advance telephone numbers corresponding to the single button dialing key (T1) 41a, the single button dialing key (T2) 41b, and the single button dialing key (T3) 41c.

Figure 12:
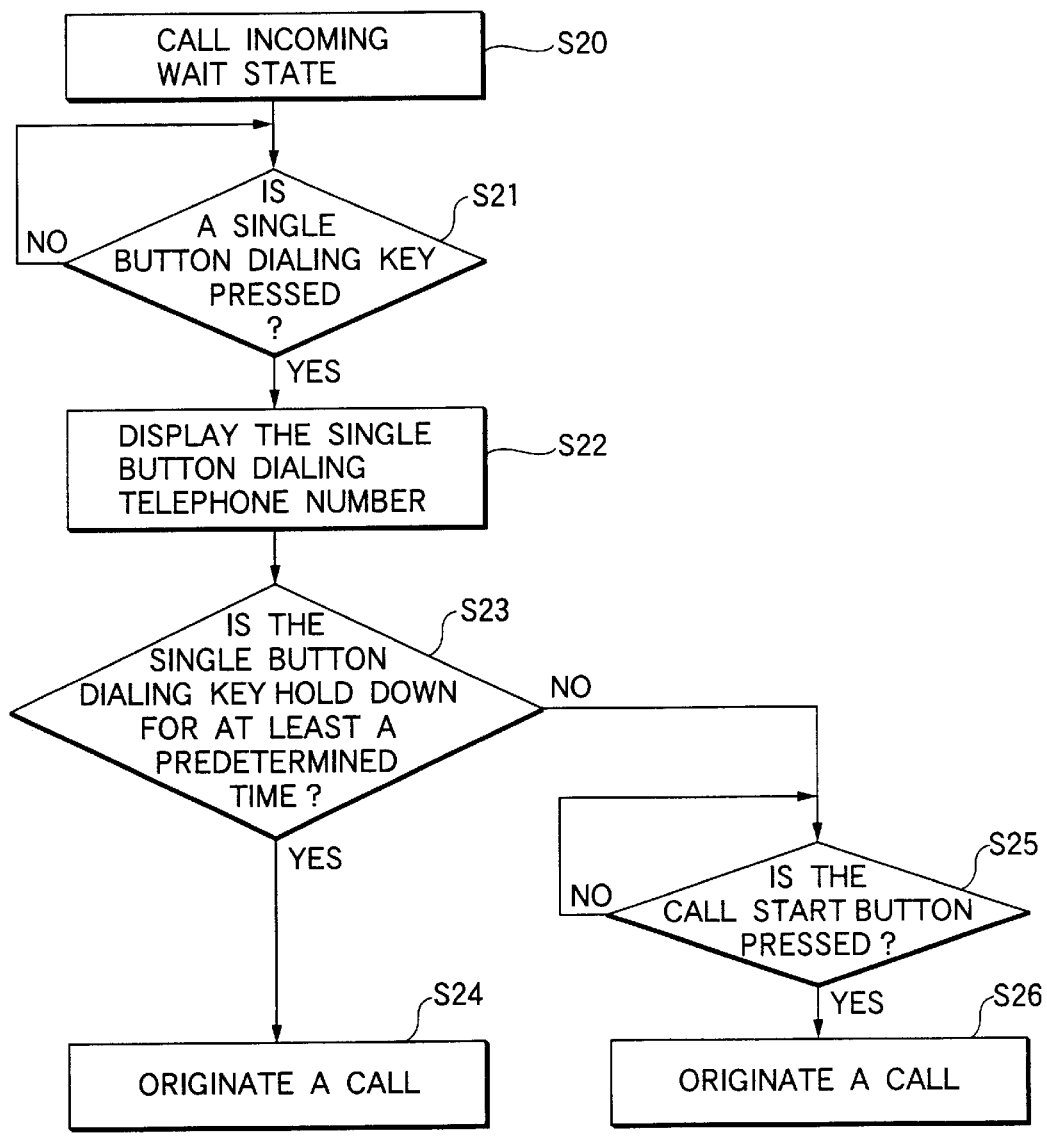
FIG. 12 is a flowchart of the operation in which the user originates a call by using an one touch dialing according to the third embodiment of the invention.

FIG. 12 is a flowchart of an operation at a time of an single button dialing. In the call incoming wait state (step 20), when a single button dialing key is pressed (step 21), the controller 22 reads the corresponding telephone number from the memory 25 and displays the corresponding telephone number on the display 4 (step 22). When a predetermined time has elapsed with the single button dialing key held down, a so-called hold-down state (step 23), call origination is made to via the radio communications section 21 and the antenna 20 (step 24). Even in case the single button dialing key is released halfway, pressing the call start button 5 (step 25) with the telephone number displayed on the display 4 originates a call (step 26).

When the distant party answers the call, the user talks with the distant party via the receiver 33 and the transmitter 34 provided on the outer surface of the first case body 1. While providing two transmitters and two receives on single portable telephone apparatus may be a duplicated design, this configuration allows a more favorable usage depending on time and place, because the user may wish to be engaged in a call with the main unit folded in compact size so that the user can carry the portable telephone apparatus anywhere.

Figure 13A:
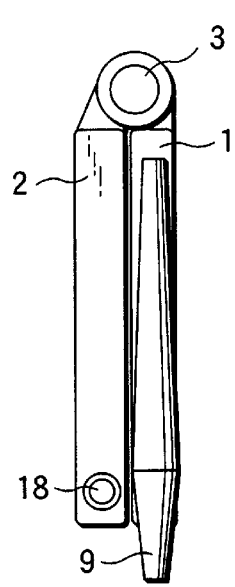
FIG. 13A is a side view of folding portable telephone apparatus according to the fourth embodiment of the invention with the main body folded.
Figure 13B:
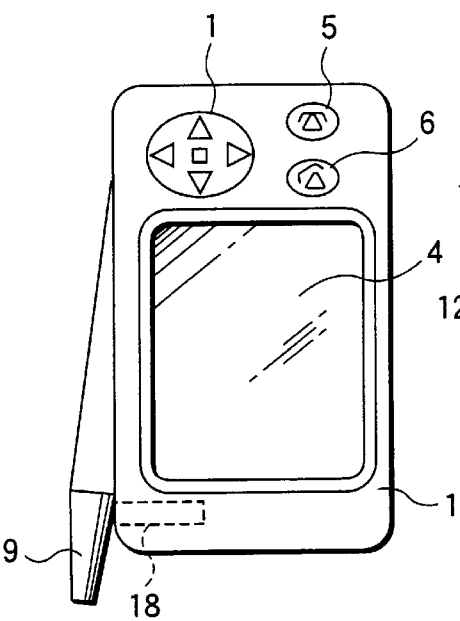
FIG. 13B is a front view of folding portable telephone apparatus according to the fourth embodiment of the invention with the main body folded.
Figure 13C:
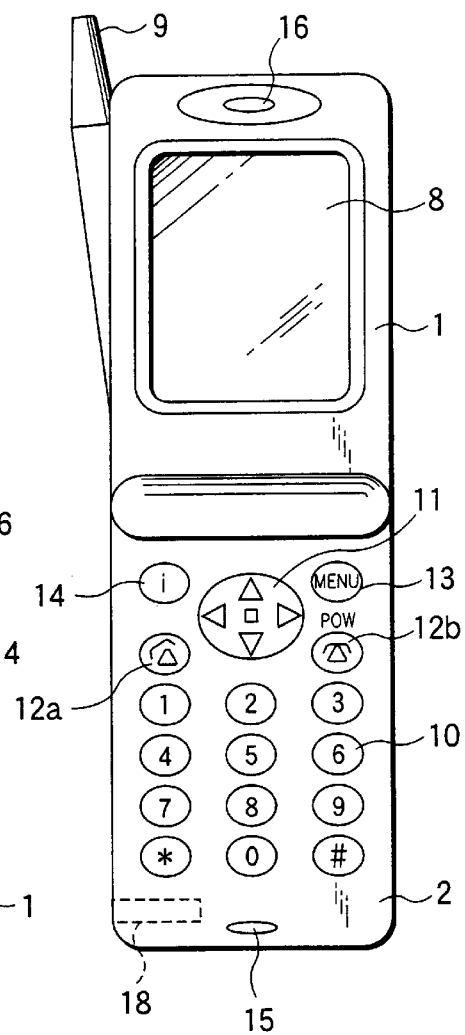
FIG. 13C is a front view of folding portable telephone apparatus according to the fourth embodiment of the invention with the main body unfolded.

FIG. 13 shows the fourth embodiment of the invention. The fourth embodiment differs from the other embodiments in that an antenna 9 is provided on the side of the first case body 1 equipped with the first display 4 and the second display 8. FIG. 13A is a side view of folding portable telephone apparatus according to the fourth embodiment of the invention with the main body folded. FIG. 13B is a front view of folding portable telephone apparatus according to the fourth embodiment of the invention with the main body folded. FIG. 13C is a front view of folding portable telephone apparatus according to the fourth embodiment of the invention with the main body unfolded. Same reference numerals are used for the same sections as in the first embodiment of the invention.

In the fourth embodiment of the invention, an antenna 9 is provided retractably on the side of the first case body 1.

Figure 14A:
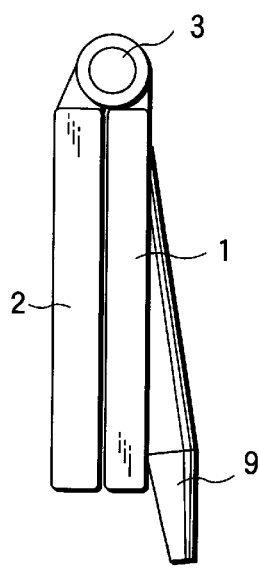
FIG. 14A is a side view of conventional folding portable telephone apparatus with the main body folded.
Figure 14B:
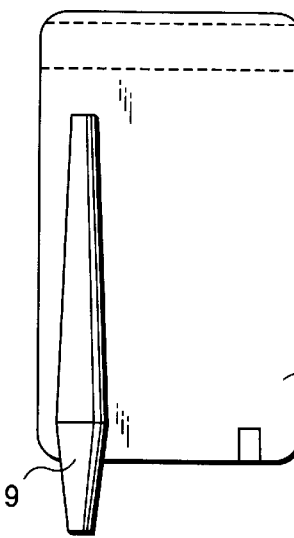
FIG. 14B is a front view of conventional folding portable telephone apparatus with the main body folded.
Figure 14C:
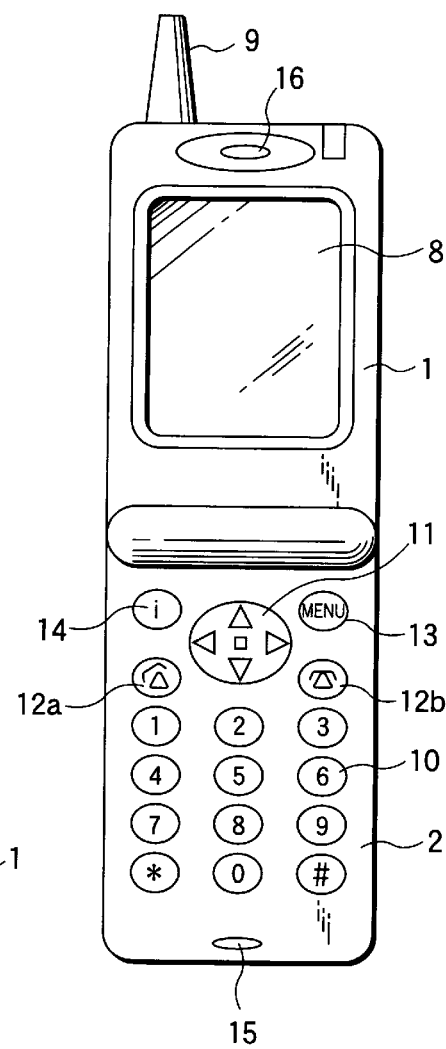
FIG. 14C is a front view of conventional folding portable telephone apparatus with the main body unfolded.

This configuration has an advantage that the first display 4 can be large-sized although antenna retracting operability is almost the same as in a conventional example in FIG. 14.

As mentioned earlier, the first aspect of the invention is folding portable telephone apparatus having a folding main body, wherein the apparatus is equipped with at least first display, a call start button, and a call release button on the outer surface of the main body and second display on the inner surface of the main body, that an earphone microphone is provided on the main body in a detachable way, that the telephone number of the caller of a terminating call or the name associated with the telephone number is displayed on the first display or a destination telephone number in call origination or the name corresponding to the destination telephone number is displayed, and that the user originates a call by operating the call start button, talk with the distant party, and releases the call by operating the call release button. This configuration has an advantage that the user can check the telephone number of the caller or the name of the caller even when the main body is folded, then the user can answer a call and talk with the distant party via an earphone microphone.

The second aspect of the invention is folding portable telephone apparatus having a folding main body, wherein the apparatus is equipped with at least first display on the outer surface of the main body and second display on the inner surface of the main body, that an earphone microphone with switch is provided on the main body in a detachable way, that the telephone number of the caller of a terminating call or the name associated with the telephone number is displayed on the first display or a destination telephone number in call origination or the name corresponding to the destination telephone number is displayed, and that the user originates a call by operating the switch of the earphone microphone with switch, talk with the distant party via the earphone microphone with switch, and releases the call by operating the switch of the earphone microphone with switch. This configuration has an advantage that the user can check the telephone number of the caller or the name of the caller even when the main body is folded, then the user can answer a call, talk with the distant party, and release the call by using an earphone microphone with switch.

The third aspect of the invention is folding portable telephone apparatus having a folding main body, wherein the apparatus is equipped with at least first display, a call start button, a call release button, a transmitter, and a receiver on the outer surface of the main body and second display on the inner surface of the main body, that at least the telephone number of the caller of a terminating call or the name associated with the telephone number is displayed on the first display or a destination telephone number in call origination or the name corresponding to the destination telephone number is displayed, and that the user originates a call by operating the call start button, talk with the distant party via the transmitter and the receiver on the outer surface of the main body, and releases the call by operating the call release button. This configuration has an advantage that the user can check the telephone number of the caller or the name of the caller even when the main body is folded, then the user can answer a call and talk with the distant party via the transmitter and the receiver on the outer surface of the main body.

The fourth aspect of the invention is folding portable telephone apparatus according to any of the first through third aspect of the invention, wherein the apparatus is equipped with an antenna retractable slantwise on the side of the main body. This configuration has an advantage that it is possible to make the main body easier to grasp without the antenna protruding in the direction of thickness of the main body and reducing the protrusion from an antenna receiver at the foot of the antenna.

What is claimed is:

1. A folding portable telephone apparatus comprising:
   a folding main body;
   a first display provided on an outer surface of the main body for displaying caller information at a time of an incoming call and information regarding a destination party at a time of a call origination;
   a second display provided on an inner surface of the main body;
   an operation section provided on the outer surface of the main body for operating at least establishing and releasing a call; and
   an earphone microphone detachably connected to the main body for talking with the destination party.

2. A folding portable telephone according to claim 1,
   wherein the caller information includes on of a telephone number of the caller and a caller's name,
   wherein the information regarding the destination party includes at least one of a telephone number of the destination party and a name of the destination party.

3. A folding portable telephone apparatus according to claim 1 further comprising a single button dialing key provided on the outer surface of the main body.

4. A folding portable telephone apparatus according to claim 1 further comprising an antenna retractable slantwise on the side of the main body.

5. A folding portable telephone apparatus comprising:
   a folding main body;
   a first display provided on an outer surface of the main body for displaying caller information at a time of an incoming call and information regarding a destination party a time of a call origination;
   a second display provided on an inner surface of the main body; and
   an earphone microphone detachably connected to the main body, the earphone microphone includes an operation section for operating at least establishing and releasing a call.

6. A folding portable telephone apparatus according to claim 5,
   wherein the caller information includes one of a telephone number of the caller and a caller's name,
   wherein the information regarding the destination party includes at least one of a telephone number of the destination party and a name of the destination party.

7. A folding portable telephone apparatus according to claim 5 further comprising a single button dialing key is provided on the outer surface of the main body.

8. A folding portable telephone apparatus according to claim 5 further comprising an antenna retractable slantwise on the side of the main body.

9. A folding portable telephone apparatus comprising:
   a folding main body;
   a first display provided on an outer surface of the main body for displaying caller information at a time of an incoming call and information regarding a destination party at a time of a call origination;
   a second display provided on an inner surface of the main body; an operation section provided on the outer surface of the main body for operating at least establishing and releasing a call;

a receiver provided on the outer surface of the main body; and a transmitter provided on the outer surface of the main body.

10. A folding portable telephone apparatus according to claim 9, wherein the caller information includes one of a telephone number of the caller and a caller's name, wherein the information regarding the destination party includes at least one of a telephone number of the destination party and a name of the destination party.

11. A folding portable telephone apparatus according to claim 9 further comprising a single button dialing key for dialing a single preprogrammed number corresponding to the single button dialing key provided on the outer surface of the main body.

12. A folding portable telephone apparatus according to claim 9 further comprising an antenna retractable slantwise on the side of the main body.

13. The folding portable telephone apparatus according to claim 9, wherein the receiver and transmitter are provided on the same outer surface as the first display device.

14. A folding portable telephone apparatus according to claim 1 further comprising a navigation key on the outer surface of the main body for scrolling screen information.

15. A folding portable telephone apparatus according to claim 5 further comprising a navigation key on the outer surface of the main body for scrolling screen information.

16. A folding portable telephone apparatus according to claim 9 further comprising a navigation key on the outer surface of the main body for scrolling screen information.

* * * * *